US006336190B1

(12) United States Patent
Yamagishi et al.

(10) Patent No.: US 6,336,190 B1
(45) Date of Patent: Jan. 1, 2002

(54) STORAGE APPARATUS

(75) Inventors: Toshihiro Yamagishi; Tadaaki Isobe, both of Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/268,715

(22) Filed: Mar. 17, 1999

(51) Int. Cl.[7] ................................................... G06F 13/38
(52) U.S. Cl. ............................................. 713/400; 710/61
(58) Field of Search ............................... 713/400; 710/58, 710/61; 711/167; 327/141, 144–153

(56) References Cited

U.S. PATENT DOCUMENTS

| 4,989,223 A | * | 1/1991 | Katayose et al. ............... 377/39 |
| 5,548,620 A | * | 8/1996 | Rogers ........................... 375/354 |
| 5,706,474 A | * | 1/1998 | Takeuchi et al. ................ 711/1 |
| 5,933,623 A | * | 8/1999 | Umemura et al. ........... 713/400 |

FOREIGN PATENT DOCUMENTS

| JP | 8-180678 | 7/1996 |
| JP | 9-180432 | 7/1997 |

* cited by examiner

*Primary Examiner*—Thomas M. Heckler
(74) *Attorney, Agent, or Firm*—Mattingly, Stanger & Malur, P.C.

(57) ABSTRACT

A memory system for use in a high-speed computer system, such as a super computer, has synchronous-type storage elements organized in groups for storing data. A storage control section has a clock generator circuit that generates parallel transfer clock signals that compensate for overall transfer delay when data is transferred to the storage elements. Each of the storage elements groups has a phase-locked locked loop circuit that outputs timing signals for accepting data, including address and control signals, etc., at the storage elements. Data is read out from the storage elements to a return data holding circuit of the storage control section using return parallel transfer clock signals, which are controlled by a control section phase-locked loop circuit that receives as an input a timing output of the phase-locked loop circuit of one of the storage element groups. A clock distribution circuit controls the supply of clock signals to a flip-flop group in the return data holding circuit. A timing signal supplied to one of the flip-flop circuits is returned to the storage control phase-locked loop circuit for controlling the timing of the acceptance of the transferred data in the flip-flop group of the return data holding circuit.

13 Claims, 15 Drawing Sheets

STORAGE APPARATUS

FIELD OF THE INVENTION

The present invention relates to a storage apparatus having a storage control section and a plurality of clock synchronized storage elements and, more particularly, relates to a storage apparatus with a clocked parallel transfer system which tolerates changes in the operating frequency.

BACKGROUND OF THE INVENTION

In a storage apparatus for use in a computer system operating at high speeds, it is possible that the signal transferring time from the storage control section to the farthest storage element exceeds one operating cycle. As a result, the storage control section is unable to accept the information signals delivered from the plurality of storage elements, each thereof having different transferring times, all at the same timing. In such cases, when asynchronous type storage elements are used, circuits for delaying the clocks are usually provided to compensate for the storage elements being at different distances. Since the clock signals are supplied to these delay circuits, information signals from the farthest storage element and the nearest storage element are accepted by flip-flops at the same time.

SUMMARY OF THE INVENTION

When storage elements of a clock-synchronized type are used, the storage elements operate in synchronism with the clock. This can cause a problem with write operations into a certain logical unit of a storage element group which must be made at the same timing. To solve this problem, the transfer times are equalized by making all of the distances from the storage control section to each of the storage elements the same. Specifically, this can be achieved by ensuring that the required distances from the storage control section to the storage elements are equal to the distance from the storage control section to the farthest storage element. When full-synchronous transfer under such conditions is attempted, an increase in the transfer delay caused by making the required distances equal to the farthest storage element results. Accordingly, it is difficult to secure the operation margin when parameters such as the set-up time are defined on the basis of the timing of the clocks input to the storage elements, especially if general-purpose storage elements are used. Accordingly, it becomes difficult to hold the operating frequency. Therefore, the memory throughput greatly drops and the processor performance also decreases.

A primary object of the present invention is to provide a storage apparatus with a clocked parallel transfer system, in which the timing of the clocks is matched to the delay in the transferred information signals, in both writing and reading operations, whereby the problems related to delay and ensuring the operation margin required for high-speed operation are overcome.

Another object of the invention is to provide a storage apparatus with a clocked parallel transfer system capable of flexibly setting the timing for achieving transfer time matching among the storage elements to thereby suppress the need to change the number of required cycles for reading or writing, which occurs when the operating frequency is decreased below the regular frequency.

A further object of the invention is to provide a storage apparatus capable of efficiently suppressing the occurrence of delays in the distribution system and fluctuations in the delay, which occur when a clock tree is formed in the distribution system for generating return clocks for accepting the read data.

According to the invention, the storage apparatus has a storage control section and a plurality of storage elements of the clock-synchronized type. When information signals are transferred from the storage control section to the plurality of storage elements, signals are transferred that have a specific relationship with the clock for delivering the information signals to the plurality of storage elements. Such signals are, for example, parallel transfer clock signals that are associated with the information signals and function as the clock for the storage elements under timing constraints related to the delay in the transfer of the information signals to the storage elements. And, when the information signals are transferred from the plurality of storage elements to the storage control section, signals are transferred having a specific relationship with the clock for the storage element. Such signals are, for example, return parallel transfer clock signals associated with the information signals and used as the clock for the storage control section to accept the information signals under timing constraints related to the delay in the transfer of the information signals to the storage control section.

Further, the invention includes storage element phase-locked loop circuits (PLL circuits) to which the storage elements are connected. Signals are transferred from the storage control section that are associated with the information signals and that are used as the reference signals for the storage element PLL circuits to thereby match the phase of the clocks for the storage elements with the timing for accepting the information signals.

The storage element PLL circuits function to adjust the phase of its output such that the reference input and the feedback input are put in the same phase. The adjustment is made to ensure that the number of cycles required for the reading or writing operation dose not change even when the apparatus is operated at a lower operating frequency than the regular operating frequency. The PLL circuit functions without the need for switching means for adapting to the change in the operating frequency, and the feedback amount in the PLL circuit may be made great so that the relative time difference between the information signal and the source clock signal becomes one cycle to thereby match the relative time difference with the accepting timing of the information signals.

Further, the invention includes a storage control section PLL circuit that is connected to receive a signal transferred from the storage elements that is associated with the information signals as the reference signal for the PLL circuit. The storage control section PLL circuit matches the phase of the clocks for accepting the information signals from the storage elements with the timing for accepting the information signals. For example, according to a preferred embodiment of the invention, after a signal such as the return parallel transfer clock is returned to the PLL circuit, the output of the PLL circuit is supplied, through a clock distribution tree, as the clocks for a group of flip-flops to accept the information signals and one of the clocks is used as the feedback signal for the storage control section PLL circuit, so that fluctuations in the matching of the timing of the return parallel transfer clocks are suppressed.

DETAILED DESCRIPTION OF THE PREFERRED EMBODIMENTS

Figure 1:
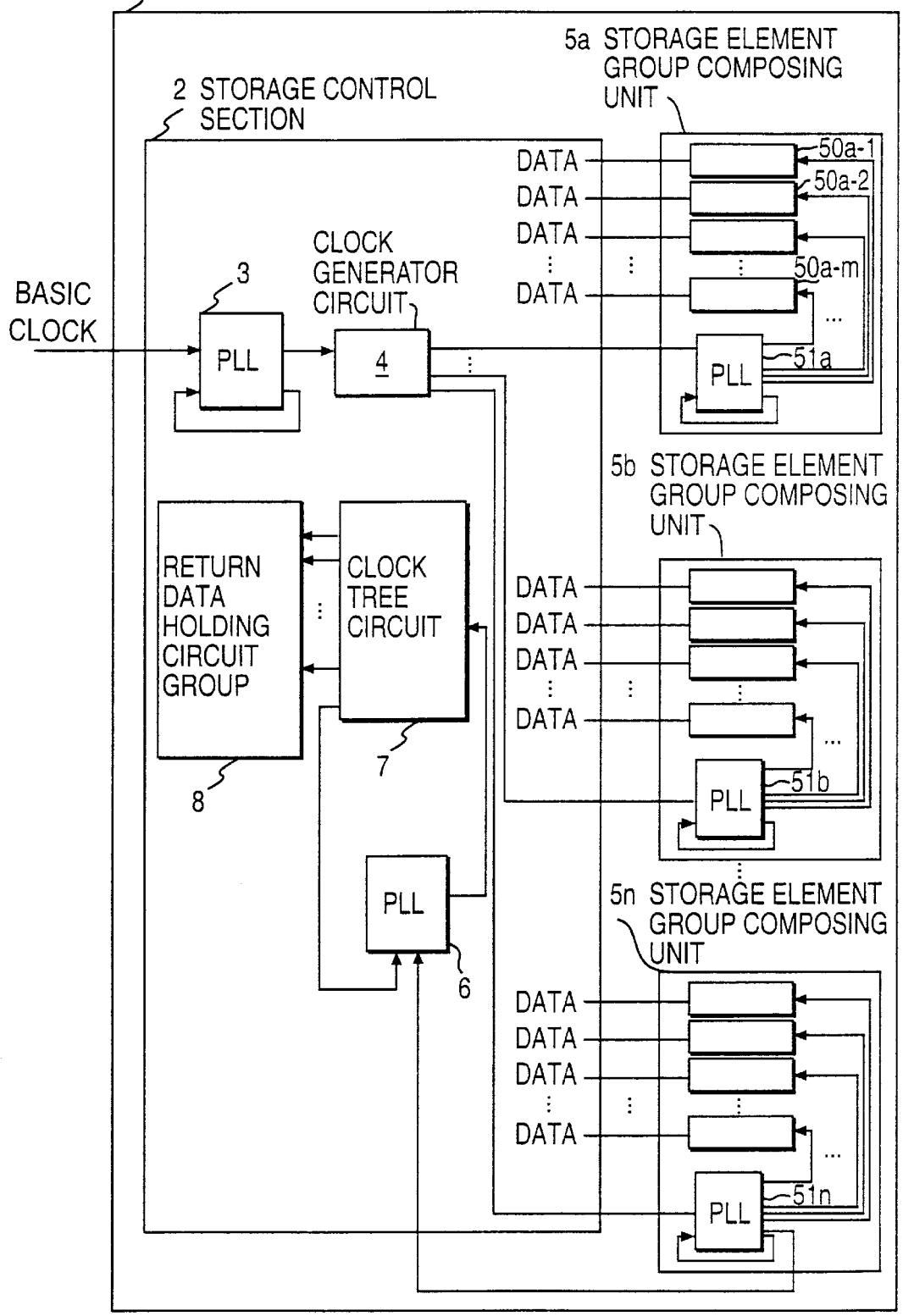
FIG. 1 shows a general configuration of a storage apparatus embodiment of the invention.

FIG. 1 shows a general block diagram of a storage apparatus according to an embodiment of the invention. Referring to the figure, the storage apparatus 1 includes a storage control section 2 and a plurality of storage element group composing units 5a to 5n.

The storage control section 2 includes a storage controlling PLL circuit 3 accepting a clock (basic clock) from a high-order apparatus for generating a master clock for use in the storage control section 2. A clock generator circuit 4 generates a clock signal for flip-flops (shown in FIG. 4) for transmitting information signals (data, addresses, read/write signals) to the storage element group and parallel transfer clocks in a specific relationship therewith. A return data holding PLL circuit 6 receives a return clock from the storage element group. The return clock is associated with the return information signals received from the storage element group. PLL circuit 6 is used for matching the phase of the clocks for accepting the return data with the accepting timing of the return data. A clock tree circuit 7, which receives the output of the PLL circuit 6, generates and distributes the return parallel transfer clocks for accepting the return data. A return data holding circuit group 8 accepts and holds the return data from the storage element group.

The storage element group composing unit 5a is formed of a plurality of storage elements (memory) of a clock-synchronized type (50a–1 to 50a–m) and a storage element PLL circuit 51a which receives the parallel transfer clock from clock generator circuit 4 associated with information signals transferred from the storage control section 2. PLL circuit 51a matches the phase of the clocks for the storage element group with the accepting timing of the information signals.

Each of the storage element group composing units 5a–5n is the same as that of unit 5a with the following exception. The output clock of the PLL circuit 51n of the storage element group composing unit 5n is adapted, in the present embodiment, to be returned as the return clock to the PLL circuit 6 of the storage control section 2. Further, alternatively, the output clock of any of the PLL circuits of the storage element group composing units 5a to 5n may be returned to the PLL circuit 6 of the storage control section 2.

Figure 2:
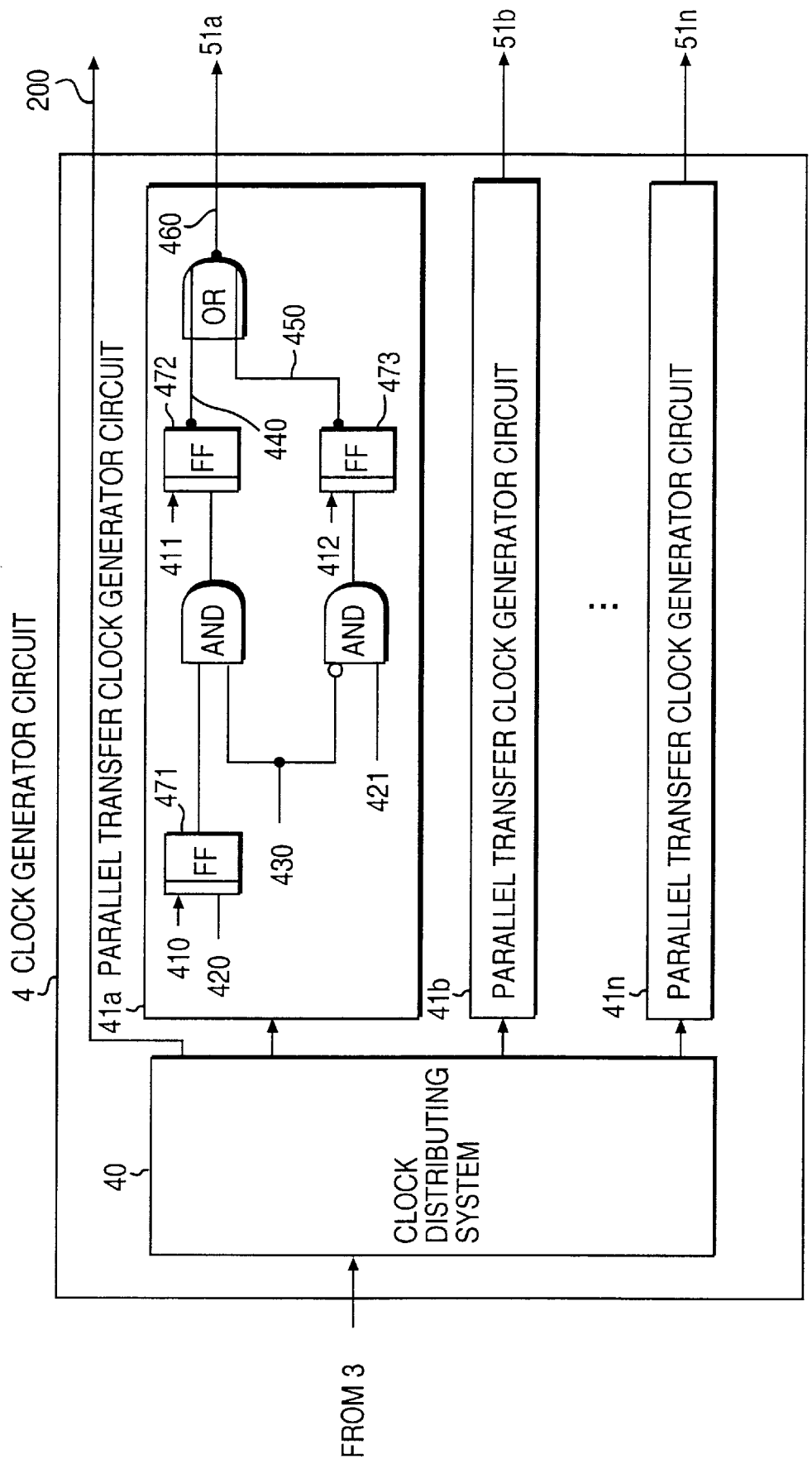
FIG. 2 is a diagram of the clock generator circuit of FIG. 1.

FIG. 2 shows an example of the configuration of the clock generator circuit 4. The clock generator circuit 4 is formed of a clock distributing system 40 and a plurality of parallel transfer clock generator circuits 41a to 41n. Each of the parallel transfer clock generator circuits 41a to 41n is prepared for a corresponding one of the storage element group composing units 5a to 5n. The basic clock signal for the clock generator circuit 4 is supplied from the PLL circuit 3 and this clock signal is divided into a plurality of clock signals by the clock distributing system 40, with part thereof supplied to the flip-flops for delivering data to the storage element group. In FIG. 2, such signals collectively are shown as the synchronous clock signal 200. The remaining part of the clock signals from the clock distributing system 40 are supplied to the parallel transfer clock generator circuits 41a to 41n.

In each of the parallel transfer clock generator circuits 41a to 41n, a parallel transfer clock is generated, which in turn is transferred to a corresponding one of the storage element group composing units 5a to 5n as the clock for the storage element group, associated with information signals (data, address, read/write signals, etc.). Here, in the case where only the same phase clocks as that of the parallel transfer clocks is used as the clocks for the storage element group, even when the operating frequency is changed and, further, the phase is already prepared by the clock distributing system 40, the parallel transfer clock generator circuits 41a to 41n are not specifically needed. When it is desired to change the phase of the clocks with the parallel transfer clocks for such purposes as expanding the transfer margin, the parallel transfer clock generator circuits 41a to 41n become necessary. Description will be made of the parallel transfer clock generator circuit 41a taken as an example.

Figure 3:
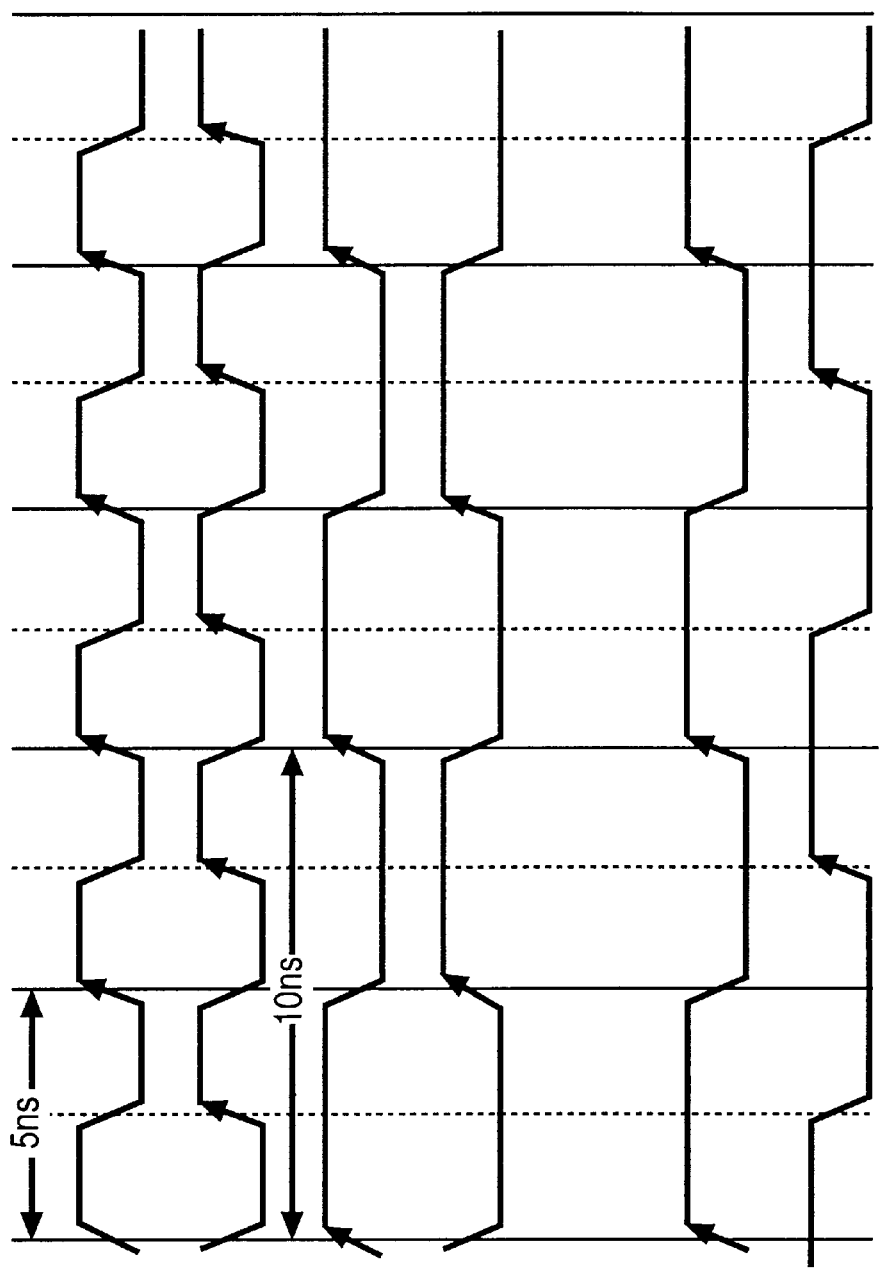
FIG. 3 is a timing chart of operations performed by the clock generator circuit shown in FIG. 2.

FIG. 3 shows a time chart in the parallel transfer clock generator circuit 41a of the structure in FIG. 2. The structure in FIG. 2 is an embodiment provided with a mode to deliver the generated clock 440 and the generated clock 450 at the two different timings as shown in FIG. 3 as parallel transfer clocks. By using the signal clock 420 and the signal clock 421 supplied from the clock distributing system 40 as the data for the flip-flops 471 and 473, and by using the clocks 410, 411, and 412 also supplied from the clock distributing system 40 as the clocks for the flip-flops 471, 472, and 473, the clocks 440 and 450 are generated. However, the generated clocks are narrowed down to one output by the mode change-over signal 430.

In the case of FIG. 2, the clock 450 is generated when the mode change-over signal 430 is 0 (Low) and the clock 440 is generated when it is 1 (High). The clock thus generated is detected at the output 460 and becomes the parallel transfer clock to be transferred to the storage element group associated with data, etc. In the case of the example shown in FIG. 3, the clock 440 has the same phase in timing as the clock supplied to the flip-flop for delivering data (synchronous clock 200) and the clock 450 is out of phase by ¼ cycle. These clock signals are generated as the parallel transfer clocks.

Figure 4:
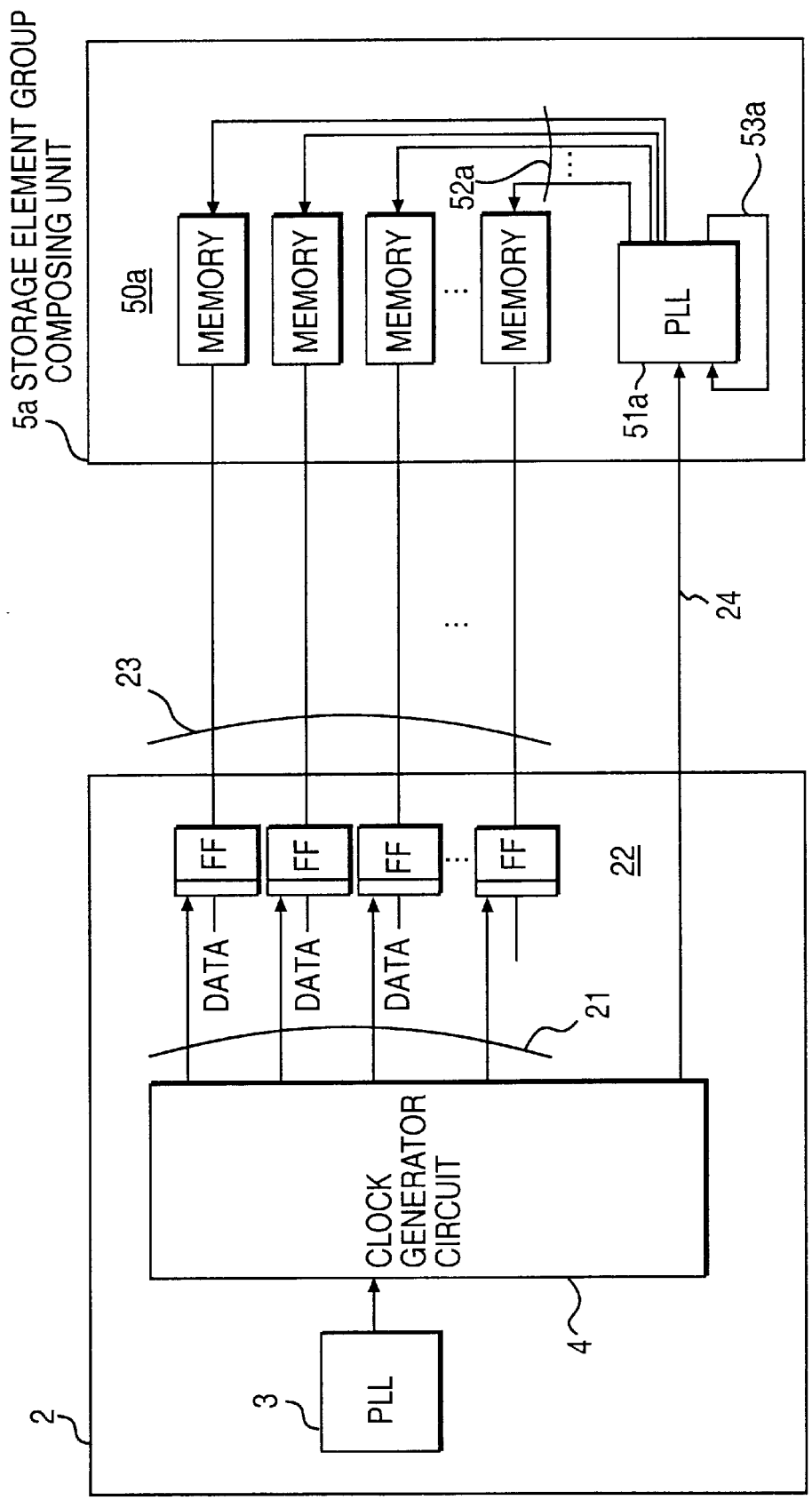
FIG. 4 is a drawing showing an example of the transfer of data from the storage control section to the storage element group.
Figure 5:
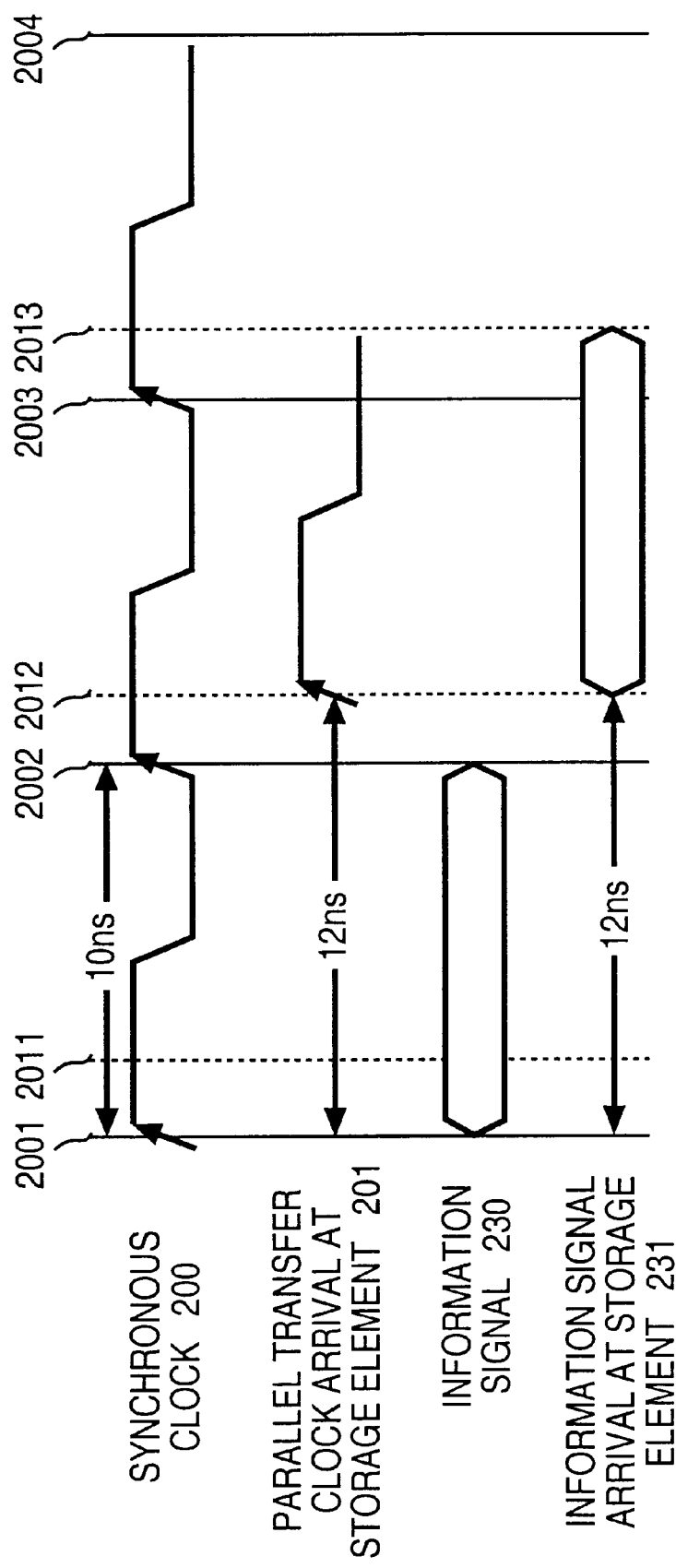
FIG. 5 is a timing diagram showing an example of the timing relationship between a parallel transfer clock and an information signal.
Figure 6:
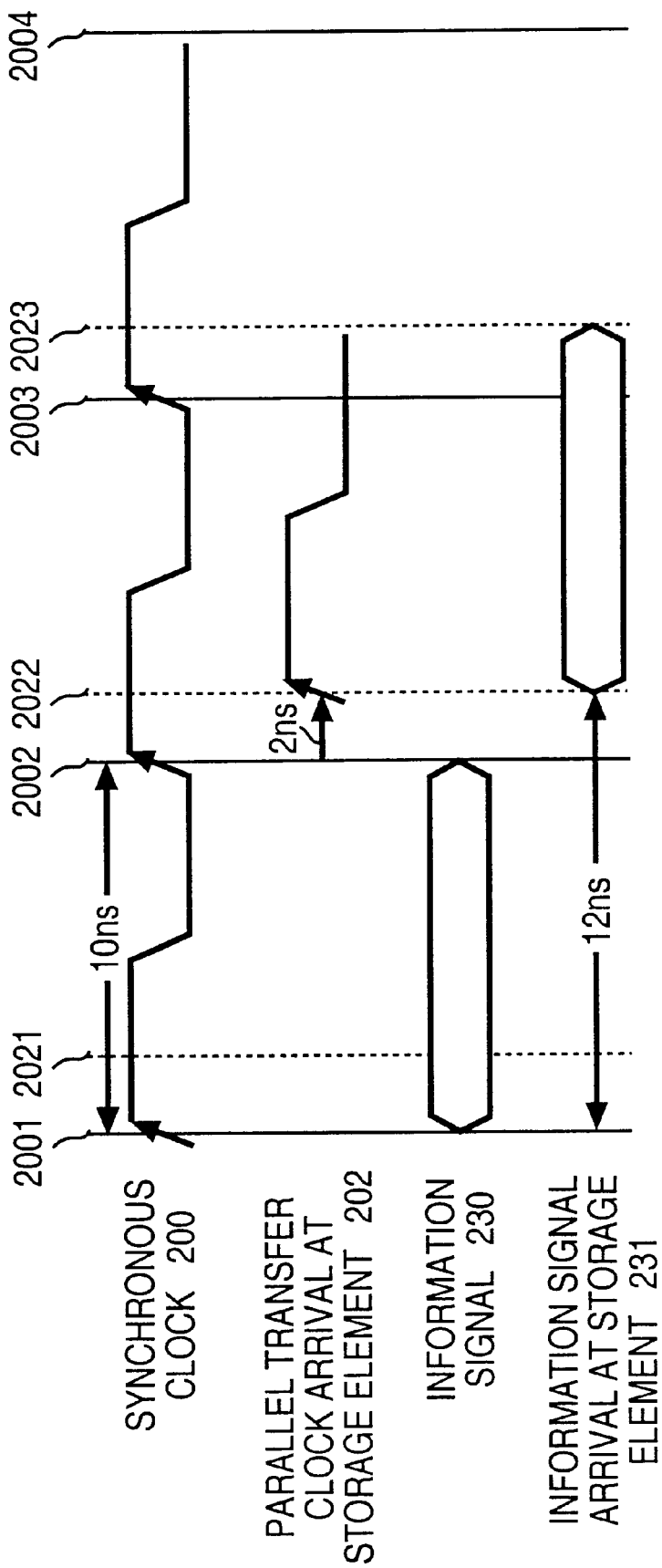
FIG. 6 is a timing diagram showing another example of the timing relationship between a parallel transfer clock and an information signal.

FIG. 4 shows the circuit configuration for the case where information signals are transferred from the storage control section 2 to the storage element group. FIG. 5 and FIG. 6 show time charts when one operation cycle is equal to 10 ns. For convenience, only the storage element group composing unit 5a of the storage element groups is shown in FIG. 4.

Referring to FIG. 4, the clock signal group 21 (synchronous signal 200) generated in the clock generator circuit 4 are supplied to the information signal delivering flip-flop group 22 and the information signals arrive at the storage element group 50a through signal line group 23. The transfer delay of the information signal at this time is assumed to be 12 ns. On the other hand, the parallel transfer clock signal generated in the clock generator circuit 4 arrives at the PLL circuit 51a through the line 24 dedicated to the clock and, further, is transferred from the PLL 51a and arrives at the storage element group 50a through clock line group 52a. The timing of arrival of the clock at the storage element group 50a is matched with the timing of arrival of the information signals by adjusting, in the PLL circuit 51a, the delay in the line 24 dedicated to the clock, the delay in the clock line group 52a and the feedback amount in the feedback line 53a, among others.

FIGS. 5 and 6 show timing charts useful for explaining examples of the matching of a parallel transfer clock with an information signal 230. In each figure a synchronous clock 200 is shown that has an operation cycle of 10 ns (timing points 2001, 2002, 2003 and 2004). In FIG. 5, the synchronous clock 200 is used as the parallel transfer clock and it is adjusted (shifted) to arrive at the storage element in 12 ns at the same time as the information signal (201, 231), and the information signal is accepted at the timing 2012 (one of the timing points 2011, 2012 and 2013 representing a shifted clock).

In the example shown in FIG. 6, the synchronous clock 200 is used as the parallel transfer clock the same as in the above example, and the feedback amount in the feedback line 53a is adjusted so that 2 ns is taken as the transfer delay of the parallel transfer clock (202). By adjusting the feedback amount and shifting the parallel transfer clock, it is matched with the timing of the arrival at the storage element (231) of the information signal 230 which was delivered one cycle before.

Since the information signals are accepted at the same timing 2012, or 2022 (one of the timing points 2021, 2022 and 2023 representing a shifted clock), in both the cases of FIGS. 5 and 6, there is no difference in particular when one operation cycle is equal to 10 ns. However, when the cycle time becomes longer, there arises a difference in accepting timing. This will be described later in detail.

Figure 7:
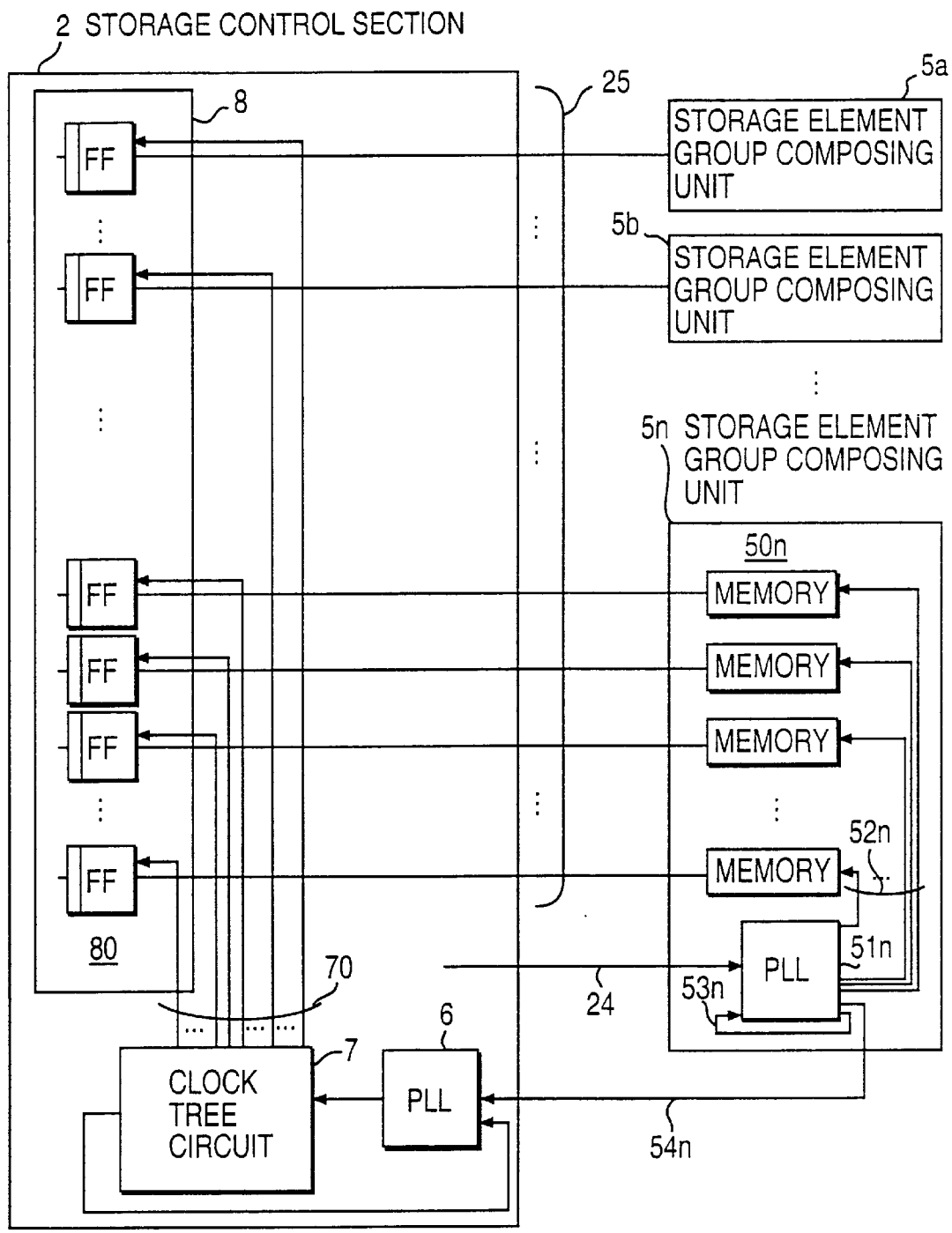
FIG. 7 is a diagram useful for showing an example of the transferring of data from the storage element group to the storage control section.

FIG. 7 shows a circuit configuration for the case of transferring information signals (data) from the storage element group to the storage control section 2 (memory read out operation). The timing charts for this operation are shown in FIGS. 8 and 9.

The storage element group composing units 5a to 5n are operated by the parallel transfer clocks supplied thereto from their respective PLL circuits 51a to 51n. Information signals (data) read out from the storage element group arrive, through signal line group 25, at flip-flop group 80 forming part of the return data holding circuit group 8 within the storage control section 2. For the signal line group 25, the signal line group 23 of FIG. 4, which is used for data transfer from the storage control section to the storage element group, can also be used. Here, the information signals (data) transferred from the storage element group to the flip-flop group 80 within the storage control section 2 will be called the return information signals. On the other hand, as to the data read out clocks for the flip-flop group 80, a parallel transfer clock output from the PLL circuit 51n of the storage element group composing unit 5n is input to the PLL circuit 6 within the storage control section 2 through the line 54n (dedicated to the clock), which signal, in turn, is divided into a plurality of clock signals in the clock tree circuit 7 and supplied to the flip-flop group 80. The parallel transfer clock returned from the PLL circuit 51n of the storage element group composing unit 5n to the storage control section 2 will hereinafter be called the return parallel transfer "clock".

While there are a plurality of storage element group composing units controlled by the storage control section 2, only one clock signal is returned to the PLL circuit 6 and, therefore, only one of the plural storage element group composing units (the unit 5n in the present embodiment) sends back the return parallel transfer clock. The PLL circuit 6 of the storage control section 2 performs such operations as adjustment of the delay of the return parallel transfer clock to thereby match the read out clock for the flip-flop group 80 with the delay of the return information signal.

Figure 8:
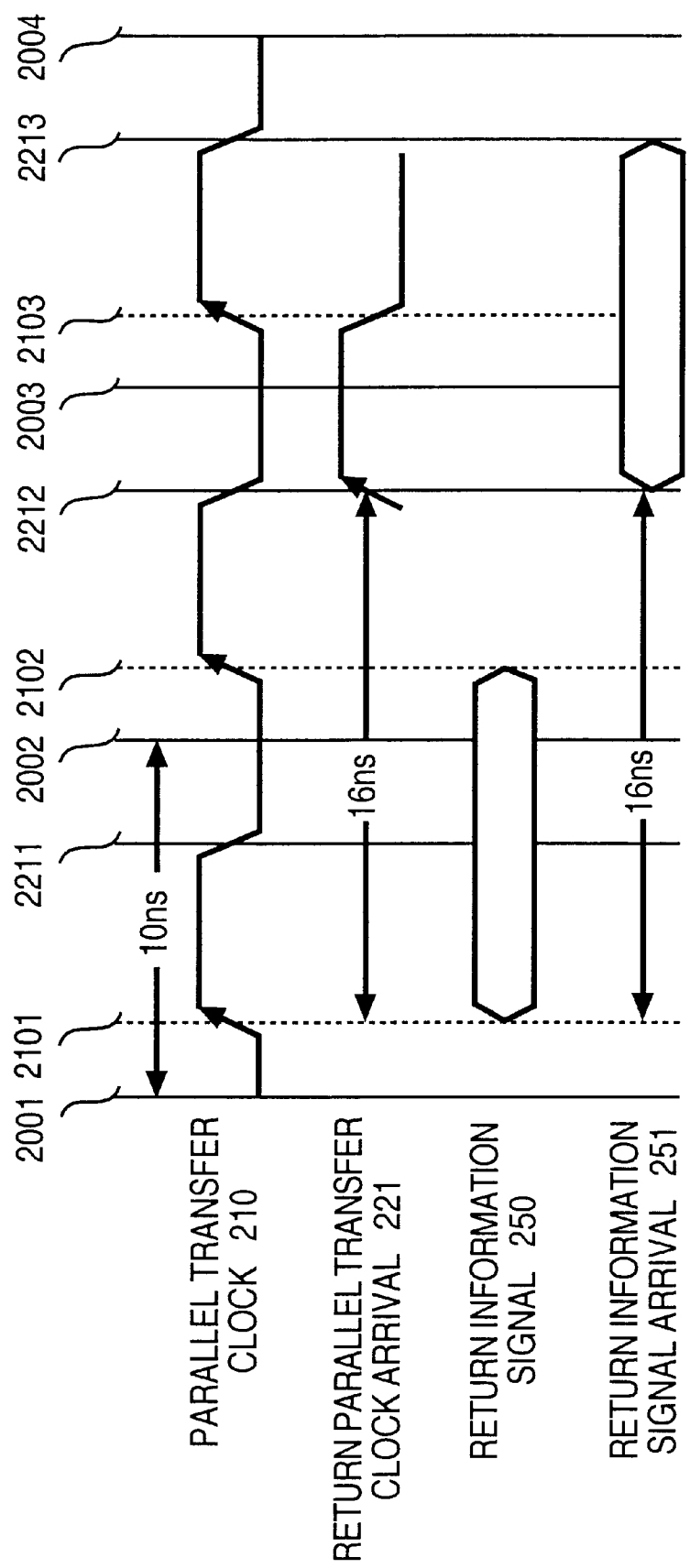
FIG. 8 is a timing diagram showing an example of the timing relationship between a return parallel transfer clock and an information signal.
Figure 9:
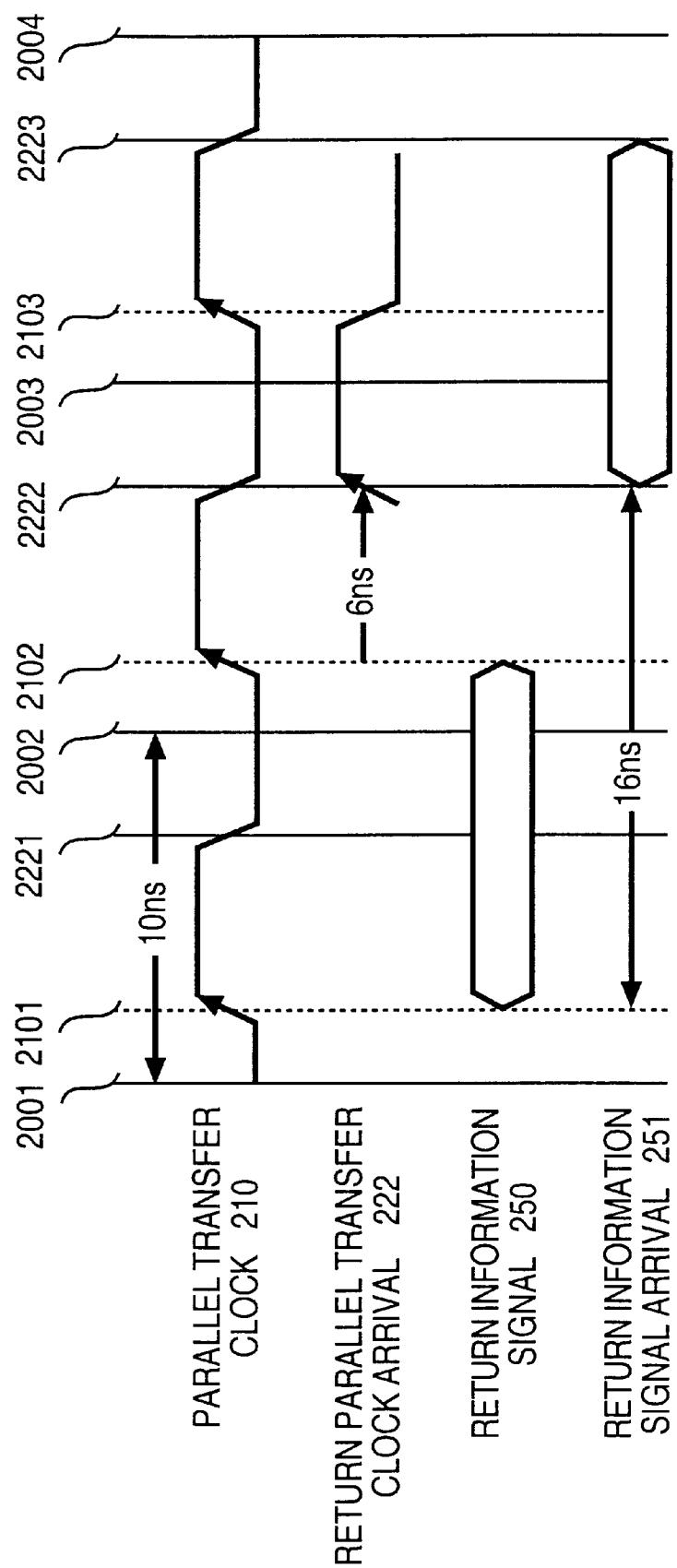
FIG. 9 is a timing diagram showing another example of the timing relationship between a return parallel transfer clock and an information signal.

FIG. 8 is a timing chart showing the transfer time of the arrival 221 of the return parallel transfer clock (timing points 2101, 2102 and 2103) being adjusted (with respect to the parallel transfer clock 210) to be equal in timing to the transfer delay of 16 ns of the arrival 251 of the return information signal 230 at point 2212 (one of timing points 2211, 2212 and 2213), which define a shifted clock having a 10 ns cycle). FIG. 9 is a timing chart showing the timing adjustment made by setting the transfer time of the arrival 222 of the return parallel transfer clock to 6 ns so that the arrival 251 of the return data (return information signal 250) of one cycle before can be accepted at point 2221 (one of timing points 2221, 2222 and 2223).

In these cases, as with the case of the information signal transfer from the storage control section 2 to the storage element group, when the cycle time is changed (prolonged), the number of the required cycles greatly changes in the method of FIG. 8, while the change in the number of the required cycles is less in the method of FIG. 9. Thus, a logic circuit dependent on the operating frequency becomes necessary. A specific example will be mentioned hereinafter together with an example of transferring the information signals from the storage control section 2 to the storage elements.

Figure 10:
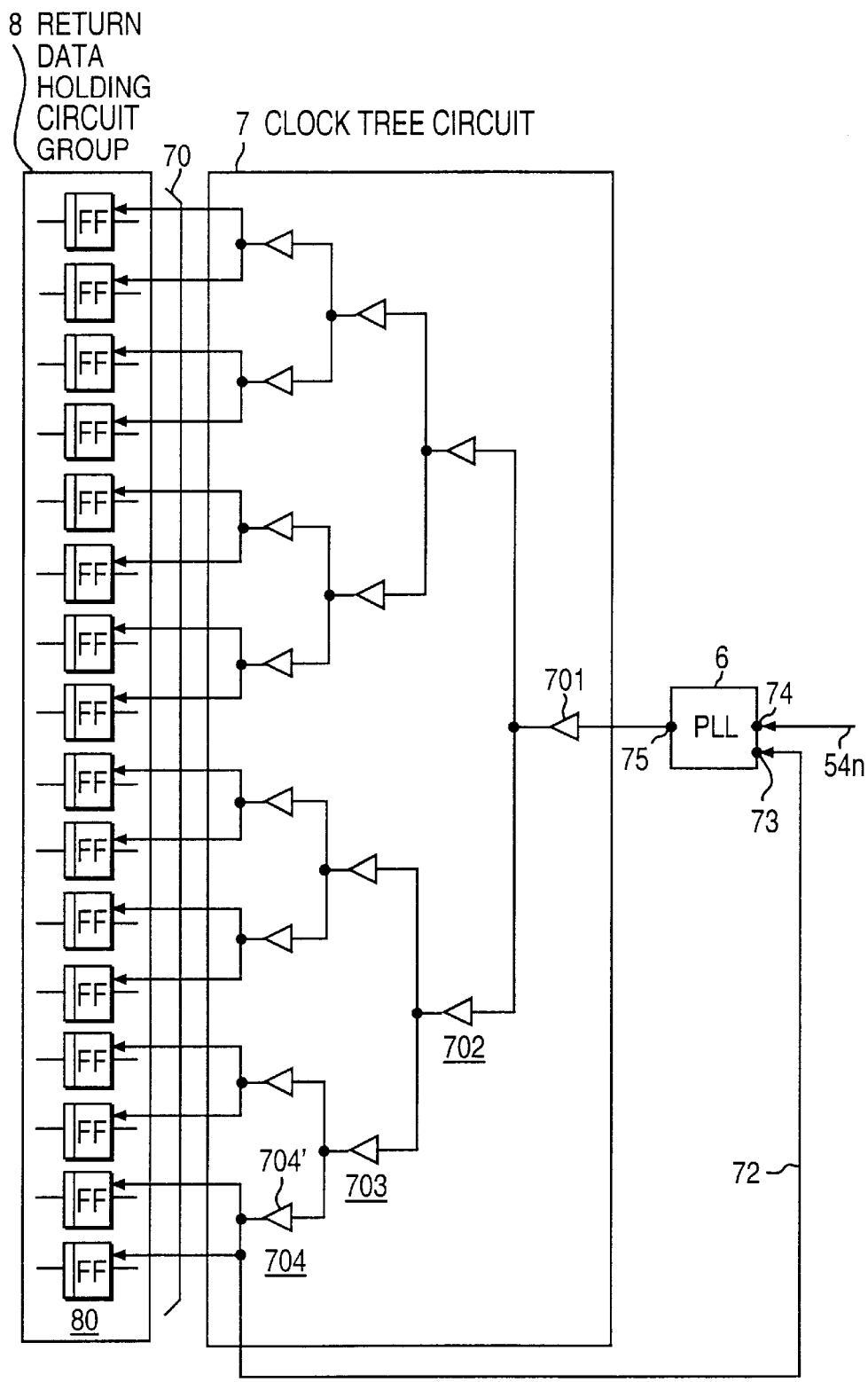
FIG. 10. is a diagram showing an example of the configuration of the return data holding circuit group 8 and the clock tree circuit 7 which perform the distribution of return parallel transfer clocks.

FIG. 10 shows an example of the configuration of the clock tree circuit 7 for distributing clock signals to flip-flop group 80, which is part of the return data holding circuit group 8. Also, the figure shows an example of the general arrangement of the clock distributing system including the PLL circuit 6. The clock signal (return parallel transfer clock) returned from the PLL circuit 51n of the storage element group composing unit 5*n* through the line 54*n* dedicated to the clock is passed through the PLL circuit 6 and is then progressively branched in a tree form by driver element groups 701 to 704 and finally input to the flip-flop group 80. In FIG. 10, while the number of the output branches of each driver is set to be two and the number of stages of the tree is set to be four, so that the number of the finally divided clock signals is set to be 16, these numbers are not specifically limited to this example. The numbers of branches and stages are selected so that the final number of required clock signals are obtained. The function of the PLL circuit 6 is as follows.

Referring to FIG. 10, one (704') of the driver group 704 at the final stage of the clock tree circuit 7 has three output branches, of which two branches are supplying clocks to the flip-flops as with other drivers but the remaining one is returning a clock, through the feedback line 72, as the reference signal for the PLL circuit 6. Namely, in the steady state, the PLL circuit 6 adjusts a signal so as to keep the points 73 and 74 in phase and delivers the signal at the point 75. Thereby, since the timing of the return parallel transfer clock on the clock signal line 54*n* is made concurrent with the timing at the input point 74 of the PLL circuit 6, it is only required that the delay up to the point 74 be adjusted and there is no need of considering delays in the driver group in the clock tree circuit 7.

As a result of the foregoing arrangement, the matching of the clock timing can be achieved, even when a great number of stages of the drivers in the clock tree circuit 7 are used, since the consequent delays have no adverse effect. Further, the number of the stages of the tree can be changed without effect, and even if the delay of the drivers varies from the standard value due to production variation, or changes in processing conditions or operating conditions, such variations do not need to be considered. Despite such fluctuations in the delay or delay variations, the phases at the points 73 and 74 are constantly kept in phase by adjustments made in the PLL circuit 6.

Figure 11:
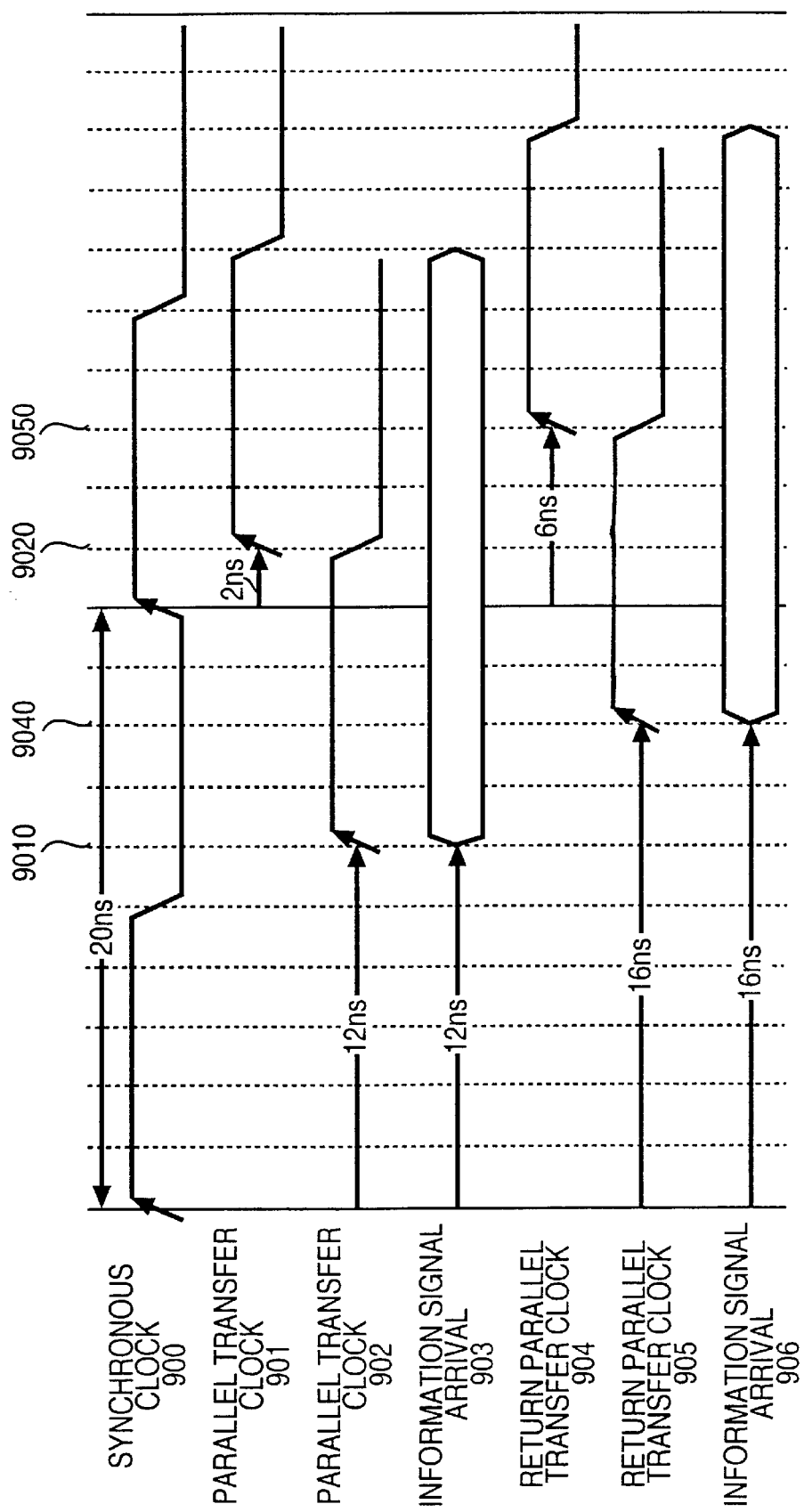
FIG. 11 is a timing diagram showing an example of the timing of parallel transfer clocks when the operating frequency is lowered.

The accepting timing of a signal changes when the cycle time is prolonged due to differences in delays of the parallel transfer clocks. FIG. 11 is a timing chart of a parallel transfer clock signal arriving from the storage control section at the storage element and a return parallel transfer clock in the reverse course, when one cycle is performed in 20 ns (synchronous clock 900). The absolute time of the delay of the data (information signals 903, 906) and the parallel transfer clock is not changed. One cycle plus 2 ns are required for accepting data according to the method of FIG. 6 (901, timing point 9020), while 12 ns within one cycle are required for accepting data in the method of FIG. 5 (902, timing point 9010). The same may be said of the return parallel transfer clock of FIG. 9 (904, timing point 9050) and FIG. 8 (905, timing point 9040). These will be considered in a sequence of operations.

Figure 12:
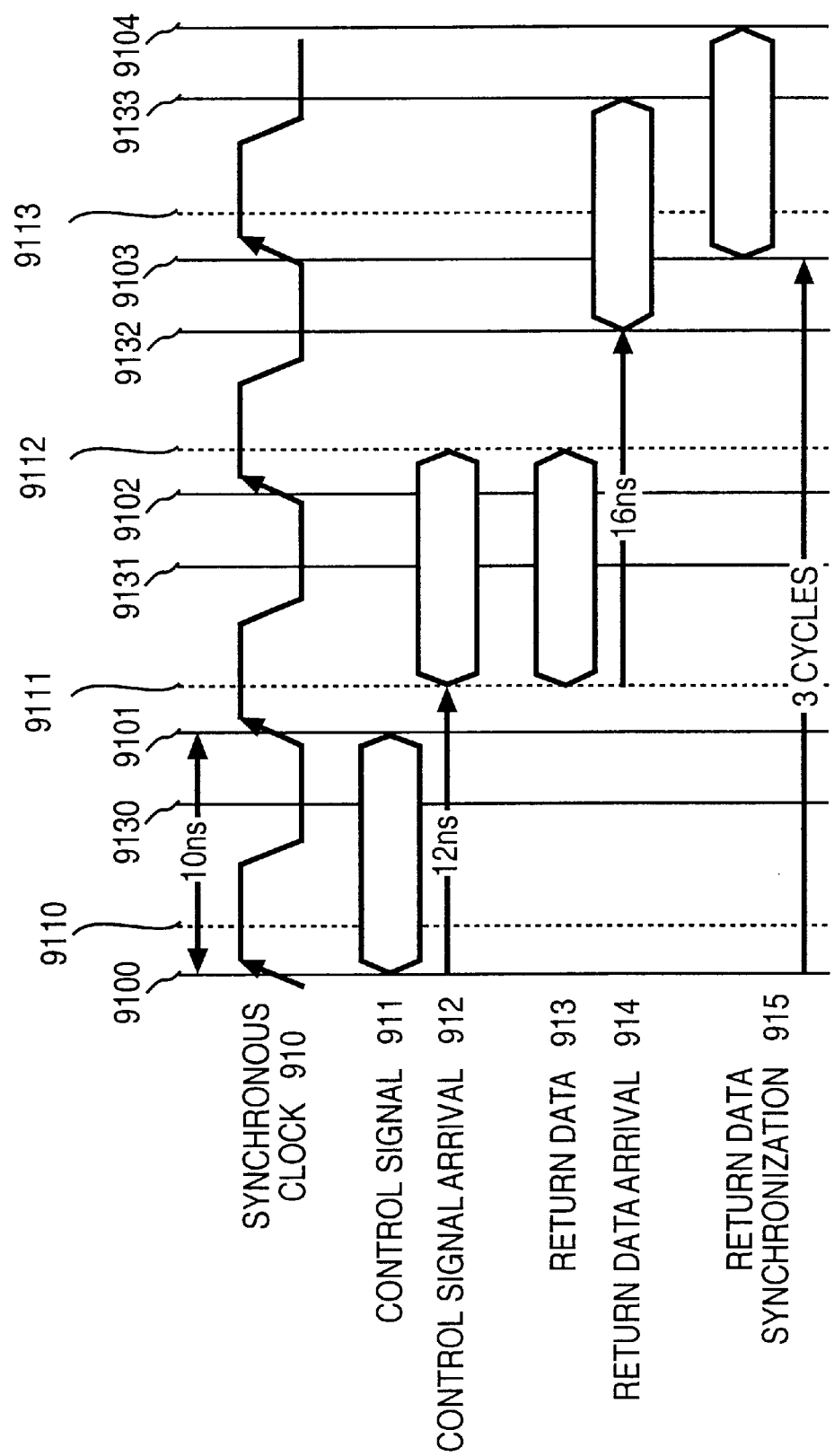
FIG. 12 is a drawing showing an example of a sequence of transfer operations of an information signal when the operating frequency is normal.

FIG. 12 shows an example in which a control signal (read signal) 911 is transmitted from the storage control section to the storage element and the return data (return information signal) 913 in response thereto is output from the storage element at timing point 9132 (one of timing points 9130, 9131, 9131 and 9132), while one operation cycle is performed in 10 ns (synchronous clock 910, timing points 9100, 9101, 9102, 9103 and 9104). Although, in the case of one operation cycle being 10 ns, there are differences in the transfer delays of the parallel transfer clock from the storage control section to the storage element group composing unit and the return parallel transfer clocks from the storage element group composing unit to the storage control section as shown in FIG. 5 and FIG. 6, and FIG. 8 and FIG. 9, respectively, they arrive at the same timing 9111 or 9132 with respect to the synchronous clock 910 and, hence no difference is observed in the accepting timing of the control signal 912 which arrives at the storage element at timing point 9111 (one of timing points 9110, 9111, 9112 and 9113) and the accepting timing of the return data 914 that arrives at the storage control section. Consequently, in the case of FIG. 12, the number of cycles required for completing a sequence of operations up to the return data synchronization 915 at timing point 9103 is 3 cycles.

Figure 13:
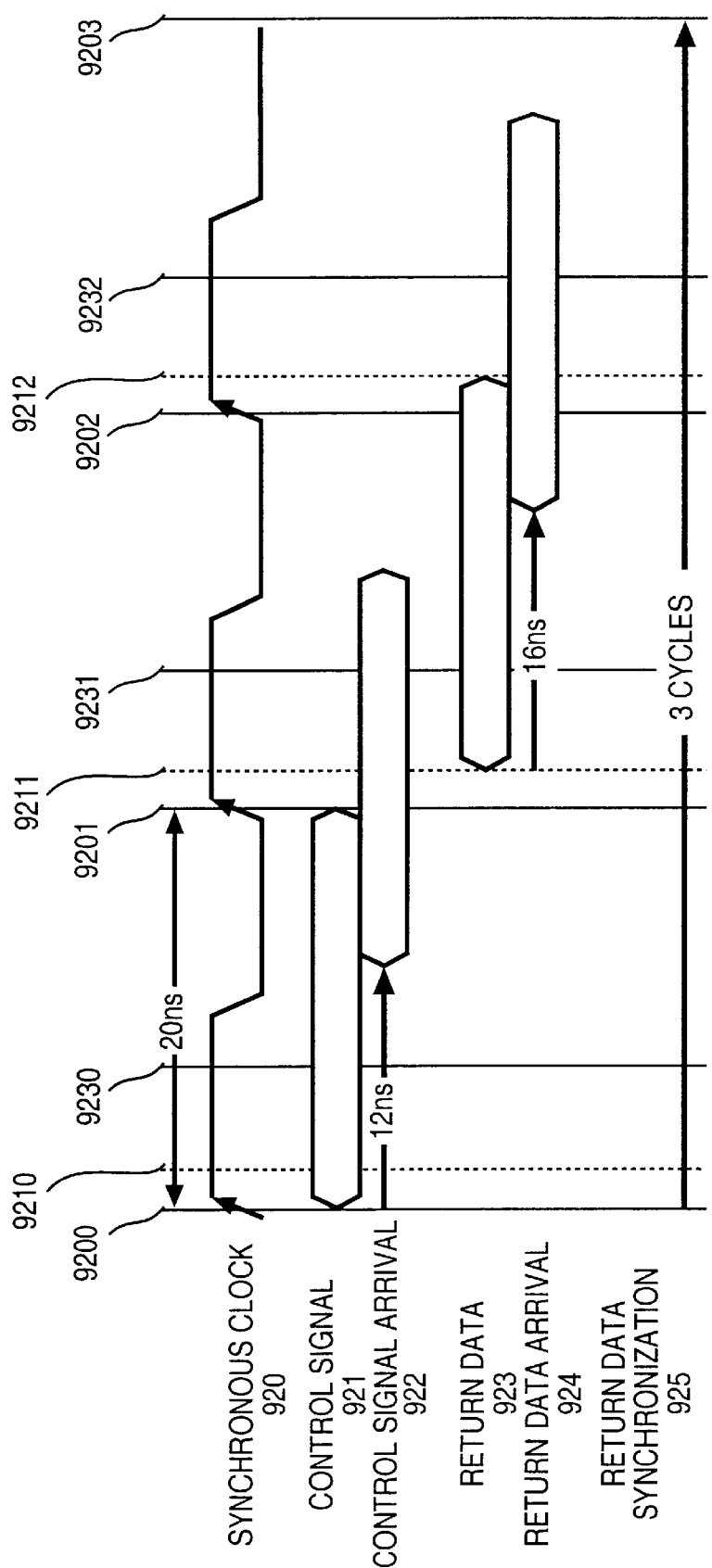
FIG. 13 is a timing diagram showing a first example of a sequence of transfer operations of an information signal when the operating frequency is lowered.

FIG. 13 shows a timing chart in the case where the transfer delays of the parallel transfer clock and the return parallel transfer clock are as small as 2 ns and 6 ns, respectively, with the cycle time (synchronous clock 920, timing points 9200, 9201, 9202 and 9203) is increased to 20 ns. Since the delay of the control signal 921 is 12 ns, its arrival at the storage element is as indicated by the control signal arrival 922, but the accepting timing is at the timing 9211. The return data 923 is output at the same timing 9211 (one of timing points 9210, 9211 and 9212) and arrives at the storage control section 16 ns later as indicated by the return data arrival 924, but the accepting timing is the timing 9212. Thus, the number of cycles required for the sequence of operations is 3, thus it is not different from the case shown in FIG. 12 in which the cycle time was 10 ns.

Figure 14:
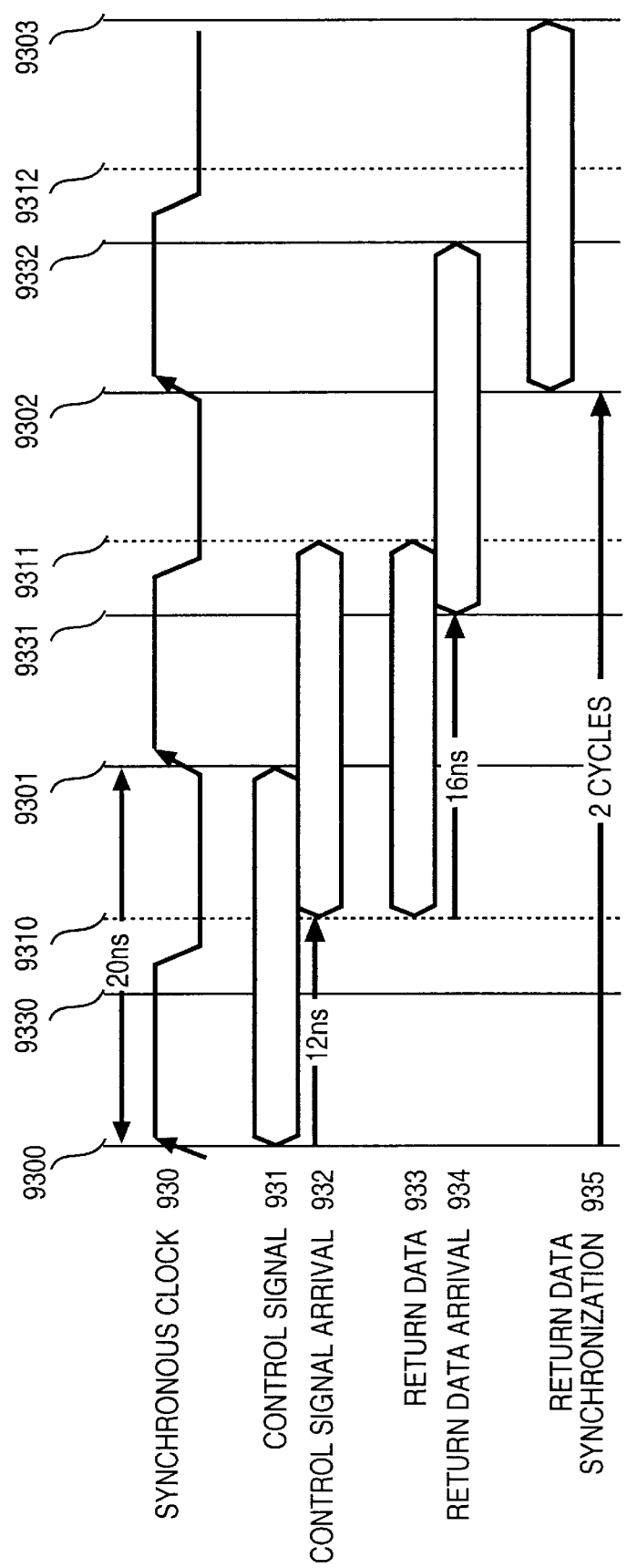
FIG. 14 is a timing diagram showing a second example of a sequence of transfer operations of an information signal when the operating frequency is lowered.

FIG. 14 shows a time chart in the case where the transfer delays of the parallel transfer clock and the return parallel transfer clock are 12 ns and 16 ns, respectively, while the cycle time is 20 ns. The points different from FIG. 13 include first that the timing of the parallel transfer clock is 12 ns behind the synchronous clock 930 and the timing of the return parallel transfer clock is 16 ns further behind that, or totally 28 ns behind. Accordingly, the timing with respect to the synchronous clock 930 (timing points 9300, 9301, 9302 and 9303) of the parallel transfer clock becomes the timing 9310 to 9312 and that of the return parallel transfer clock becomes the timing 9330 to 9332. The sequence of operations will be as follows: The control signal 931 arrives at the storage element 12 ns later than the synchronous clock (932) and, because the parallel transfer clock is transmitted with the same delay, it is taken in at the timing 9310. The return data 933 is output from the storage element at the same timing 9310 and returns to the storage control section 16 ns later, as indicated by the return data arrival 934, and taken in at the timing 9331 of the return parallel transfer clock. Thereafter, it is synchronized at the timing 9302. The number of cycles required for the sequence of operations is 2, i.e., while the absolute time is not changed from the case of one cycle being 10 ns, the number of cycles has been decreased by one cycle.

Since in general a fixed number of necessary transfer cycles are expected by the side of the storage control section, when a change is produced in the number of transfer cycles depending on the frequency as described above, it becomes necessary to provide a device to make a mode change or the like according to the frequency so that the number of transfer cycles is made equal to the expected necessary number of transfer cycles.

Figure 15:
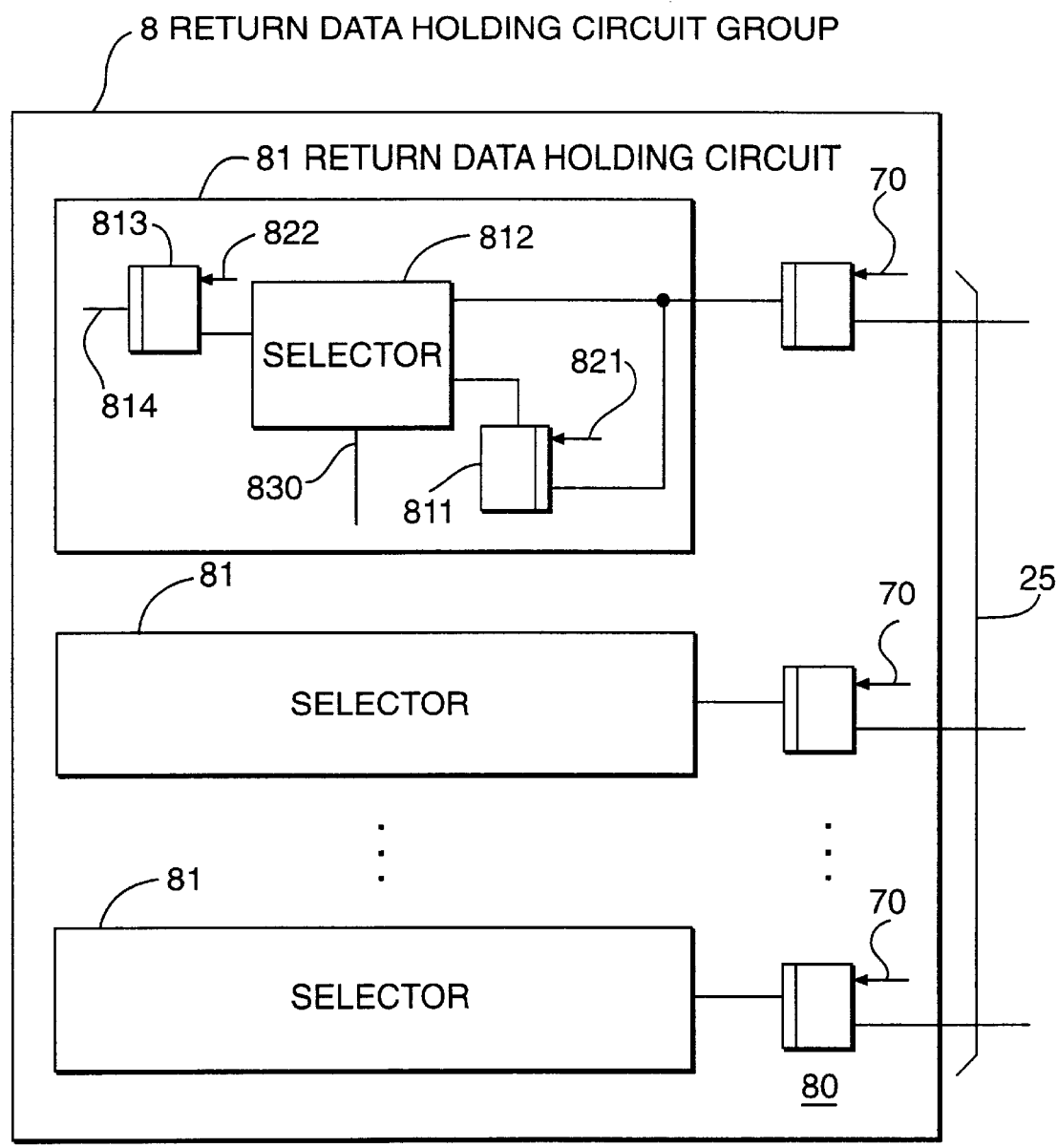
FIG. 15 is a diagram showing an example of a configuration of a return data holding circuit group which copes with a change in the number of cycles required for a sequence of transferring operations of an information signal when a change in the operating frequency occurs.

FIG. 15 shows an example of the return data holding circuit group 8 including a circuit for coping with changes in the operating frequency. The above described example is for the case where the operating frequency is decreased from a 10 ns cycle to a 20 ns cycle. When the cycle time is increased to 20 ns, the number of cycles necessary for one sequence of operations to be performed is consequently decreased one cycle as seen from FIG. 12 to FIG. 14. Namely, the signals arrives at the storage control section 2 one cycle before it is originally expected. The problem may be solved by taking such a measure as providing one more stage of the flip-flop to hold one more cycle of data. Operations will be described specifically with reference to one return data holding circuit 81 of FIG. 15.

As shown, return information signals (return data) arrive at the flip-flop group 80 through the signal lines 25 and are accepted according to the return parallel transfer clocks 70. In the case of the ordinary operating frequency, outputs from the return data holding circuit group 80 are used as they are, but in the case where the operating frequency is decreased and data for one more cycle is to be held, the data is held for one cycle in the flip-flop 811 which is used with the synchronous clock 821. The selector 812 receives input signals differing by one cycle in phase from each other, and it is adapted such that the output from the flip-flop group 80 is selected at the normal operating frequency and the output from the flip-flop 811 is selected when the number of cycles required for one sequence of operations changes as the result of degradation of the operating frequency. Since the data at the expected timing is output from the selector 812, the data is synchronized with the synchronous clock 822 at the flip-flop 813 and becomes the signal 814 to be finally sent to the high-order apparatus.

An embodiment of the invention has been described above. In fabricating the storage apparatus of the invention in the form of an LSI, when the configuration shown in FIG. 1 is taken as an example, the storage control section 2 and the plurality of the storage element group composing units 5a to 5n may be integrated collectively into one LSI or integrated individually into separate LSIs.

According to the storage apparatus of the invention, as described above, various effects can be obtained as follows:

(1) By transferring clocks in parallel with information signals and matching the signal accepting timing with the delay of the information signal, the operation margin can be expanded and high-speed operations in the storage apparatus can be achieved.

(2) By increasing the feedback amount in the PLL circuit provided on the side of the storage elements thereby keeping the difference between the delay of the information signal and the delay of the parallel transfer clock at one cycle, it is made possible, without adding any function, to keep the number of cycles necessary for operations between the storage control section and the storage elements unchanged even when the operating frequency is decreased below the regular frequency.

(3) By providing a PLL circuit for accepting return data on the side of the storage control section thereby absorbing delays and fluctuations thereof in the clock tree circuit, which generates clocks for the return data accepting flip-flops on the basis of a return parallel transfer clock from the side of the storage elements, it is made possible to suppress timing fluctuations of the return parallel transfer clocks, without consideration of the portion of the clock tree circuit.

While preferred embodiments have been set forth with specific details, further embodiments, modifications and variations are contemplated according to the broader aspects of the present invention, all as determined by the spirit and scope of the following claims.

We claim:

1. A storage apparatus having a storage control section and a plurality of clock-synchronized type storage elements, comprising:

at least one first circuit connected to said storage elements;

said storage control section generating a synchronous clock used for operation cycles and said storage control section having a clock generating circuit and a transfer clock used in timing the transferring of data to said storage elements transferred from said storage control section;

said first circuit receiving said transfer clock and outputting timing signals for each of said storage elements for controlling timing of accepting data received from said storage control section;

a data output holding circuit in said storage control section; and a second circuit receiving one of said output timing signals from said first circuit, said second circuit adjusting timing of transfer of data from said storage elements transferred to said storage control section and to be held in said data output circuit.

2. A storage apparatus according to claim 1, wherein said first circuit is a first phase-locked loop circuit receiving said transfer clock as an input and one of said output timing signals as a feedback signal.

3. A storage apparatus according to claim 2, wherein said clock generating circuit generates a parallel transfer clock as said transfer clock that is received by said first phase-locked loop circuit and that is used in timing the transferring of data to said storage elements, and wherein said parallel transfer clock signal is received by said second circuit as said one of said output timing signals which is then provided to said data output holding circuit as a return parallel transfer clock signal that is timed to the arrival of said transferred data to be held in said data output holding circuit.

4. A storage apparatus according to claim 3, wherein said data holding circuit has a group of flip-flops that respectively hold data transferred to said storage control section from said storage elements, and wherein said storage control section has a clock distribution circuit connected to said second circuit that distributes said return parallel transfer clock signal as timing signals to each of said flip-flops for controlling timing of receiving of the transferred data from the storage elements.

5. A storage apparatus according to claim 4, wherein said clock distribution circuit includes a clock tree circuit having a plurality of stages and drivers, a final output of said drivers supplies said timing signals to said flip-flops of said return data holding circuit, said second circuit is a second phase-locked loop circuit receiving said one of said output timing signals as an input signal, and further wherein at least one of said timing signals supplied by said drivers is fed back to said second phase-locked loop circuit for controlling timing of said return parallel transfer clock signal that is supplied to said clock distribution circuit.

6. A storage apparatus according to claim 5, wherein said second phase-locked loop circuit controls said at least one of said timing signals output from said first phase-locked loop circuit and said at least one of said timing signals supplied by said drivers to be in phase for controlling timing of said return parallel transfer clock signal that is supplied to said clock distribution circuit.

7. A storage apparatus according to claim 3, wherein said return data holding circuit includes at least two output flip-flops for outputting the transferred data received from said storage elements and a selector for selecting one of said at least two output flip-flops, wherein said selector selects a corresponding one of said at least two output flip-flops in accordance with an operating frequency of said storage apparatus.

8. A memory system for a high speed computer, comprising:

a storage control section and a plurality of clock-synchronized type storage element groups having a plurality of storage elements;

said storage control section generating a synchronous clock used for operation cycles and said storage control section having a clock generating circuit and a transfer clock used in timing the transferring of data to said storage elements transferred from said storage control section;

a plurality of first phase-locked loop circuits respectively connected to said storage element groups;

said plurality of first phase-locked loop circuits receiving said transfer clock and outputting timing signals for each of said respective storage elements of a corresponding group for controlling timing of accepting data received from said storage control section;

a data output holding circuit in said storage control section; and a second phase-locked loop circuit receiving one of said output timing signals from one of said plurality of first phase-locked loop circuits, said second phase-locked loop circuit adjusting timing of transfer of data from said storage elements transferred to said storage control section and to be held in said data output circuit.

9. A high speed memory system according to claim 8, wherein said clock generating circuit generates a parallel transfer clock as said transfer clock that is received by said first phase-locked loop circuits and that is used in timing the transferring of data to said storage elements, and wherein said parallel transfer clock signal is received by said second phase-locked loop circuit as said one of said output timing signals which is then provided to said data output holding circuit as a return parallel transfer clock signal that is timed to the arrival of said transferred data to be held in said data output holding circuit.

10. A high speed memory system according to claim 9, wherein said data holding circuit has a group of flip-flops that respectively hold data transferred to said storage control section from said storage elements, and wherein said storage control section has a clock distribution circuit connected to said second phase-locked loop circuit that distributes said return parallel transfer clock signal as timing signals to each of said flip-flops for controlling timing of receiving of the transferred data from the storage elements.

11. A high speed memory system according to claim 10, wherein said clock distribution circuit includes a clock tree circuit having a plurality of stages and drivers, a final output of said drivers supplies said timing signals to said flip-flops of said data holding circuit, and further wherein at least one of said timing signals supplied by said drivers is fed back to said second phase-locked loop circuit for controlling timing of said return parallel transfer clock signal that is supplied to said clock distribution circuit.

12. A storage apparatus according to claim 11, wherein said second phase-locked loop circuit controls said at least one of said timing signals output from said one of said first phase-locked loop circuits and said at least one of said timing signals supplied by said drivers to be in phase for controlling timing of said return parallel transfer clock signal that is supplied to said clock distribution circuit.

13. A storage apparatus according to claim 9, wherein said data holding circuit includes at least two output flipflops for outputting the transferred data received from said storage elements and a selector for selecting one of said at least two output flip-flops, wherein said selector selects a corresponding one of said at least two output flip-flops in accordance with an operating frequency of said storage apparatus.

* * * * *